(12) United States Patent
Momeni et al.

(10) Patent No.: US 12,025,139 B2
(45) Date of Patent: Jul. 2, 2024

(54) PUMP ASSEMBLY AND METHOD OF CONTROLLING A PUMP

(71) Applicant: GRUNDFOS HOLDING A/S, Bjerringbro (DK)

(72) Inventors: Maryam Momeni, Bjerringbro (DK); Gert Friis Eriksen, Bjerringbro (DK); Niels Erik Linnemann Nielsen, Aars (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 72 days.

(21) Appl. No.: 17/415,530

(22) PCT Filed: Dec. 19, 2019

(86) PCT No.: PCT/EP2019/086489
§ 371 (c)(1),
(2) Date: Jun. 17, 2021

(87) PCT Pub. No.: WO2020/127850
PCT Pub. Date: Jun. 25, 2020

(65) Prior Publication Data
US 2022/0056918 A1    Feb. 24, 2022

(30) Foreign Application Priority Data
Dec. 21, 2018   (EP) .................................... 18215383

(51) Int. Cl.
*F04D 15/02*    (2006.01)
*F04B 39/02*    (2006.01)
(Continued)

(52) U.S. Cl.
CPC ...... *F04D 15/0218* (2013.01); *F04B 39/0207* (2013.01); *F04D 13/06* (2013.01);
(Continued)

(58) Field of Classification Search
CPC ............... F04D 13/086; F04D 15/0263; F04D 15/0218; F04D 29/126; F04D 29/108;
(Continued)

(56) References Cited

U.S. PATENT DOCUMENTS 2,723,557 A  *  11/1955   Ohlheiser ............ G01N 27/121
                                                                73/73
3,701,138 A  *  10/1972   Pulliam ................. G01F 23/247
                                                                340/622
(Continued)

FOREIGN PATENT DOCUMENTS

CN   101206154 A   6/2008
CN   105738284 A   7/2016
(Continued)

*Primary Examiner* — Peter J Bertheaud
(74) *Attorney, Agent, or Firm* — McGlew and Tuttle, P.C.

(57) ABSTRACT

A pump assembly with at least one liquid space (32) in an interior. The liquid space (32) contains a liquid or is configured for receiving a liquid. A sensor (34, 42) is arranged in the liquid space (32), which sensor is configured to detect at least one material property of the liquid located in the liquid space (32). A filter element (44) is arranged in the interior of the liquid space (32) such that the filter element (44) shields the sensor (34, 42) with respect to the surrounding liquid space (32), the filter element (44) being permeable to the liquid. A method for controlling a pump assembly is also provided.

17 Claims, 5 Drawing Sheets

(51) Int. Cl.
*F04D 13/06* (2006.01)
*F04D 13/08* (2006.01)
*F04D 15/00* (2006.01)
*F04D 27/00* (2006.01)
*F04D 29/10* (2006.01)
*F04D 29/42* (2006.01)
*F04D 29/70* (2006.01)
*G01F 23/24* (2006.01)
*G01F 23/292* (2006.01)

(52) U.S. Cl.
CPC ........... *F04D 13/08* (2013.01); *F04D 13/086* (2013.01); *F04D 15/0077* (2013.01); *F04D 15/0088* (2013.01); *F04D 15/0263* (2013.01); *F04D 29/108* (2013.01); *F04D 29/426* (2013.01); *F04D 29/708* (2013.01); *G01F 23/242* (2013.01); *G01F 23/247* (2013.01); *G01F 23/248* (2013.01); *G01F 23/2925* (2013.01); *F04C 2240/809* (2013.01); *F04C 2240/81* (2013.01); *F04D 27/00* (2013.01)

(58) Field of Classification Search
CPC .... F04D 13/08; F04D 29/426; F04D 15/0077; F04D 13/06; F04D 15/0088; F04D 29/708; G01F 23/247; G01F 23/242; G01F 23/2925; G01F 23/248; F04B 39/0207; F04C 2240/809; F04C 2240/81
See application file for complete search history.

(56) References Cited

U.S. PATENT DOCUMENTS 6,364,620 B1 * 4/2002 Fletcher ............. F04D 15/0218
340/854.8
8,155,891 B2 * 4/2012 Kong ................. G01N 21/8507
702/50
2014/0352428 A1 12/2014 Kato
2017/0003241 A1 1/2017 Kato

FOREIGN PATENT DOCUMENTS

CN 207472829 U 6/2018
DE 102013005491 A1 10/2013
EP 1617212 B1 8/2007

* cited by examiner

PUMP ASSEMBLY AND METHOD OF CONTROLLING A PUMP

CROSS REFERENCE TO RELATED APPLICATIONS

This application is a United States National Phase Application of International Application PCT/EP2019/086489, filed Dec. 19, 2019, and claims the benefit of priority under 35 U.S.C. § 119 of European Application 18215383.3, filed Dec. 21, 2018, the entire contents of which are incorporated herein by reference.

TECHNICAL FIELD

The invention refers to a pump assembly with at least one liquid space in its interior and a method of controlling a pump.

TECHNICAL BACKGROUND

It is known in the art to integrate sensors into pump assemblies to detect properties of a liquid inside a channel or a reservoir inside the pump. In particular in submersible or waste water pumps having a dry-running electric drive motor it is known to have a liquid reservoir in a seal assembly between the electric drive motor and a pump housing. Such seal assembly comprises two shaft seals which are distanced from one another with the liquid reservoir between the seals. The liquid reservoir may for example contain oil or glycol or a glycol-water-mixture. In the prior art using oil in the liquid reservoir, it is known to provide a sensor inside this reservoir to detect a change in concentration due to entering water. Water may enter from the pump housing in case of wear of the seal arranged towards the pump housing. Due to the entering of water the concentration of water in the liquid contained in the reservoir changes and by a respective concentration sensor it is possible to detect a fault of the seal. For example from EP 1 617 212 B1 a respective capacitive sensor for detecting the concentration is known.

SUMMARY

There is the problem that gas bubbles may occur inside a liquid flowing through the pump or contained in a liquid reservoir inside the pump. Such gas bubbles may influence the measurement carried out by a sensor inside the liquid.

In view of this it is the object of the invention to provide an improved pump assembly allowing a more precise measurement of a material parameter of a liquid inside the pump. A further object is to provide a sensor arrangement for measuring the liquid material property which can be applied inside pumps and still account for effect such as turbulence, cavitation and the like. This object is achieved by a pump assembly having features according to the invention. Preferred embodiments are disclosed in the following description and the accompanying drawings.

The pump assembly according to the invention comprises at least one liquid space in its interior, preferably inside a pump housing. Said liquid space may contain a liquid or may be configured for receiving a liquid. A liquid space configured for receiving a liquid may preferably be part of a conduit for the liquid to be delivered or pumped by the pump. A liquid space containing a liquid may be for example a sealed space containing a liquid, preferably prefilled with a certain liquid, for example a coolant or lubricant. There is a sensor arranged in said liquid space. This means the sensor is arranged in the part of the liquid space which in normal use is always filled with the liquid which should be analyzed by use of said sensor. By this the sensor can come into direct contact with the liquid, preferably is submerged into the liquid contained in the liquid space. The sensor is configured to detect at least one material property of the liquid located inside that liquid space. The output from the sensor or the sensor signal, respectively, may preferably be used for further control functionalities of the pump or may be provided to external monitoring or control devices. According to the invention there is arranged a filter element in the interior of the liquid space in such a manner that it shields the sensor with respect to the surrounding liquid space. This means that the filter element at least partly separates a space containing the sensor from the further surroundings inside the liquid space. The filter element may substantially separate the entire liquid space in two parts, one part containing the sensor and the other part forming the surroundings mentioned before. Preferably the part containing the sensor is smaller, further preferred much smaller (for example having less than 25% or 10% of the volume of the entire liquid space).

Preferably the filter element forms an enclosure surrounding the sensor such that the sensor is arranged inside a space defined by the filter element.

The filter element is configured such that a liquid exchange through the filter element is possible. Thus, the liquid contained inside the liquid space can penetrate through or transfer the material properties (e.g. by flow or diffusion) through the filter to the sensor so that the sensor can detect the characteristic of the liquid inside the entire liquid space. If the characteristic of the liquid in the surroundings, i.e. in the space or part not containing the sensor is changing, this can be detected by the sensor because of the liquid exchange through the filter element. Preferably the filter element is configured such that the liquid exchange through the filter is not prohibited and is influenced to such an extent only that a sufficient liquid exchange to ensure a correct measurement by the sensor is allowed. The filter element is advantageous in that it reduces an amount of gas bubbles reaching the sensor, thereby improving the measurement carried out by the sensor. Examples of filters which have shown to be advantageous are mesh-like filters or porous filters with open porous structure. Further, filters with pore sizes in the range of 5-50 μm have shown and tested to be effective. However, the invention is not limited to such filters.

The filter element is permeable to the liquid and, preferably configured such that it decreases the ingress of gas bubbles towards the sensor. The filter element may be configured such that gas inside the liquid space is accumulating on the surface of the filter element facing away from the sensor. The filter element may prevent the gas bubbles reaching the sensor or at least reduce the number of gas bubbles reaching the sensor. According to a preferred configuration the filter may be configured such that bubbles are captured on the filter surface such that they can grow or accumulate on the surface of the filter. When reaching a certain size at some time the bubbles will rise and move upwards.

Preferably the filter element is configured such that there is substantially no pressure difference across the filter element, i.e. between both sides of the filter element. This means there is no pressure difference between the area in which the sensor element is arranged and the other parts of the surrounding liquid space.

The shielding of the sensor achieved by the filter element does not mean that there must necessarily be a complete shielding. Also a partial shielding of the sensor may be sufficient to decrease the ingress of gas bubbles towards the sensor. In particular it may be sufficient to arrange the filter element at least on such side of the sensor element which is directly impacted by a liquid flow. Furthermore, the filter element may be configured such that it is permeable for a gas but preferably impermeable for gas bubbles exceeding a certain predefined size. In particular the gas bubbles exceeding a certain size may influence the measurement result of the sensor. Furthermore, the filter should be configured such that it prevents gas bubbles from flowing to the sensor and collecting on the sensor surface. This means that it is the intention to configure the filter element such that it reduces the gas bubbles reaching the sensor by such an amount that the aggregation of gas bubbles on a sensor surface is prohibited.

According to one possible embodiment of the invention the sensor is a concentration sensor which is configured to detect the concentration of a compound inside the liquid or a component of the liquid which is located in said liquid space. However, the sensor is not limited to a concentration sensor. Preferably the concentration sensor is configured for detecting a concentration of glycol in the liquid, wherein the liquid preferably is water or a glycol-water-mixture. For example in a liquid reservoir in a sealing assembly the concentration of glycol may decrease due to entering water. This may be detected by a concentration sensor according to the invention.

According to a preferred embodiment the sensor may comprise an ultrasound sensor, a capacitive sensor and/or an optical sensor. Furthermore, additional functionalities such as for example a temperature measurement may also be incorporated into the same sensor. Preferably such a sensor is configured as a sensor for detecting a concentration of a component inside the liquid as described before.

According to one embodiment of the invention the liquid space forms at least a part of a flow path for a fluid, in particular a liquid like water which is to be delivered by the pump assembly. By such an arrangement it is possible to detect the material properties or characteristics of the pumped fluid by use of the sensor element arranged inside said liquid space.

According to a further possible embodiment of the invention the liquid space is a closed cavity in the pump assembly, for example in the pump housing. For such closed cavity there should be substantially no exchange of liquid to the outside of said cavity.

Preferably the liquid space may be a closed conduit or a closed or sealed chamber containing a liquid. This may be for example a space containing a lubricant or coolant used in the pump assembly. By such a configuration it is possible to detect the material characteristics or properties and in particular changes of at least one material property of the lubricant or coolant by use of the sensor arranged inside the liquid space.

According to a further preferred embodiment of the invention said liquid space is part of a sealing assembly and preferably forming a cooling jacket of the sealing assembly. As mentioned above, sealing assemblies in pumps having a liquid reservoir are known. The liquid reservoir contains a lubricant or coolant for lubrication and cooling of the sealing assembly. The sensor element inside such a liquid reservoir may be used to detect wear or a fault of a seal of this liquid space. Such a seal for example may be a shaft seal.

Further preferably the liquid space may be part of a sealing assembly arranged between an electric drive motor and a pump housing, wherein the pump housing contains the fluid or liquid to be delivered by the pump. Said sealing assembly preferably comprises two shaft seals which are distanced from one another and through which a drive shaft connecting the electric drive motor and at least one impeller arranged in the pump housing extends. Said liquid chamber may form a liquid reservoir arranged between these two shaft seals and surrounding the drive shaft. The liquid chamber may contain a lubricant or cooling or a liquid just ensuring or enhancing the sealing properties of the sealing assembly. In case of a fault of the shaft seal towards the pump housing there is the risk that the fluid delivered by the pump, for example water, may enter said liquid reservoir between the two shaft seals. By use of a sensor as described above and arranged inside this liquid reservoir the entering liquid can be detected. The entering liquid changes the material property of the liquid inside the liquid reservoir. In particular it is possible to detect a change of concentration of a compound or component in the liquid contained in said liquid reservoir, the concentration being the detected material property. The sensor element may be connected to a control device which can for example give an alarm if entering liquid inside the liquid reservoir is detected or the concentration of a certain compound or component inside the liquid exceeds a predefined threshold.

According to a further preferred embodiment said liquid space described above is a liquid reservoir which preferably contains glycol or a glycol-water-mixture. Glycol or a glycol-water-mixture for example may be used as a coolant and/or lubricant in a sealing assembly as described before. However, the liquid is not limited to glycol or a glycol-water-mixture. Also, other liquids as for example oil may be used as a coolant or lubricant in a sealing assembly having a liquid reservoir. Furthermore, any other suitable liquid may be contained in the liquid space, preferably forming a closed chamber or conduit.

According to a further embodiment of the invention said filter element comprises an open porous material and preferably is made from such a material. In such a material the pores may have a configuration and size such that at least a part of the liquid can pass through the filter material such that there can be ensured a liquid exchange between the part of the liquid space not containing the sensor and the other part of the liquid space containing the sensor, with the filter element arranged between these two parts or spaces. On the other side the pores of the porous material preferably are configured and dimensioned such that gas bubbles exceeding a certain size cannot pass through the filter material or such that the material of the filter element at least forms a resistance for gas bubbles such that the number of gas bubbles or the amount of gas which can reach the sensor are reduced to prevent gas bubbles from collecting on the sensor surface. As described above the filter material may cause bubbles to stay and grow on the surface of the filter. When the bubbles reach a certain size they will rise by buoyancy.

According to a possible embodiment of the invention said filter element is at least partly made from a polymer and/or a metal material, preferably comprising a sintered material. As metal material according to a preferred embodiment bronze or stainless steel could be used. As a polymer material for example polyethylene could be used. These materials can form a porous structure allowing the desired filter properties. In case of metal materials this may in particular be done by sintering. However, other manufacturing methods could be used to achieve a porous material, for example like a foam material having open pores allowing liquid to pass through the filter material.

According to a further preferred embodiment said filter element delimits a sensor space in the interior of the liquid space, inside which sensor space at least one sensing section of the sensor is arranged. The sensing section is the part of the sensor element, for example the surface, effecting the sensing or measurement. This means the sensing section is the active sensing section of the sensor which actually is detecting the material characteristic or material property of the liquid. The filter element preferably is arranged such that this sensing section is shielded with respect to the surrounding liquid space. Other parts of the sensor, like for example a support structure, which may be affected by the liquid without any influence on the measuring or sensing result, respectively, may be in direct contact with the liquid inside the liquid space. Preferably the filter element is arranged such that it is not in direct contact with the sensing section of the sensor but distanced from said sensing section so that there is an amount of liquid between the filter element and the sensor or the sensing section, respectively. However, this amount of a liquid may be much smaller than the total amount of liquid contained in the liquid space, preferably less than 10% of the total amount of liquid.

According to a further preferred embodiment there is arranged a venting device in the filter element. The venting device ensures that remaining gas bubbles inside the space shielded by the filter element can escape from this space so that an accumulation of gas bubbles inside the filter element or a space delimited by the filter element, can be avoided. Preferably the venting device is formed in form of a venting opening. Preferably this venting opening is arranged on the top side of a space delimited by the filter element and in which the sensor or at least a sensing section of the sensor is arranged. The top side is the upper side in a defined operating position of the pump assembly.

Preferably the filter element in a vertical upper region comprises at least a portion or region having a larger pore size than in the other parts of the filter element or comprises at least one hole. The region having a larger pore size or at least one hole may serve as a venting device as described before.

According to a further preferred embodiment the filter element forms a sleeve around the sensor and preferably is configured in a cup-shape manner with the sensor or a sensing section of the sensor arranged in the inside of the sleeve-like or cup-shape filter element. The sleeve-like filter element preferably may have a cylindrical shape, further preferred having a circular cross section. The sleeve may be arranged inside the liquid space such that the liquid inside the liquid space surrounds the sleeve over its entire circumference. This allows an optimal liquid exchange through this filter element. The sensor or at least a sensing section of the sensor is arranged in the interior of the sleeve so that the space containing the sensing section or the sensor is entirely surrounded by the filter element. If the filter element has a cup-shape one of the axial ends of the sleeve is also closed, preferably also by the filter material.

According to a further preferred embodiment the filter element comprises an opening at one end, preferably at one axial end. Through this opening the sensor extends into the interior of the filter element. In particular in case of a sleeve like filter element one axial end of the sleeve may be an open end through which the filter element extends into the interior of the filter element such that at least a sensing section of the sensor is arranged in the interior of the filter element and, thus, shielded against the surrounding liquid by said filter.

According to a preferred embodiment the pump assembly is configured as a submersible pump assembly and/or configured as a waste water pump assembly. In those pump assemblies the liquid space preferably is a liquid reservoir inside a sealing assembly between a dry-running electric drive motor and the pump housing as described in detail above. In particular in those pumps it is preferred to monitor the status of the sealing assembly to detect malfunctions of the sealing prior to a complete failure of the seal.

According to a further embodiment the pump assembly contains a control device which is connected to said sensor such that the control device receives a sensor signal and can analyze the sensor signal. Preferably said control device is configured such that it can set at least one control parameter depending on the sensor signal received from the sensor. Preferably the control device is configured to set the control parameter if the at least one material characteristic or material property detected by said sensor reaches or exceeds a predefined threshold. Thereby, the material property preferably is the concentration, for example the concentration of glycol inside a glycol-water-mixture contained in the liquid space. The threshold preferably is a minimum for the glycol concentration such that entering water can be detected, since due to entering water the concentration of glycol would decrease. If the concentration reaches the predefined minimum the control device may set the control parameter which may be used for further control functions as to stop the pump. Alternatively, or in addition the control parameter may be an alarm signal giving an alarm showing a user that there is a problem with the pump, for example the seal assembly.

Furthermore, the invention refers to a method for controlling a pump assembly, preferably a pump assembly as described before. The method according to the invention is a method for controlling a pump assembly, wherein the pump assembly comprises at least one liquid space in the interior, which liquid space contains a liquid or is configured for receiving a liquid, and a sensor element as described before. For further details of the liquid space it is referred to the description above concerning the pump assembly. In a first step according to the invention there is arranged a sensor in said liquid space of the pump assembly. Furthermore, there is arranged a filter in the interior of the liquid space thereby shielding the sensor with respect to the surrounding liquid space. In a further step of the method by use of the sensor and during operation of the pump assembly there is detected at least one material property of the liquid inside the liquid space. This material property preferably is the concentration of a compound or component in the liquid. In a further step of the method the material property or a value corresponding to the material property of the liquid is preferably compared to a predefined threshold. In the following a control parameter of the pump assembly may be set in dependence on said comparison. In particular a control parameter may be set or changed if the detected material property or a value corresponding to the material property exceeds the predefined threshold or falls below a predefined threshold. For further preferred features and method steps of the method according to the invention it is referred to the description above concerning the pump assembly. It has to be understood that all features described in relation to the pump assembly are also preferred features of the method according to the invention, and vice versa.

In the following a preferred embodiment of the invention is described with reference to the accompanying figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
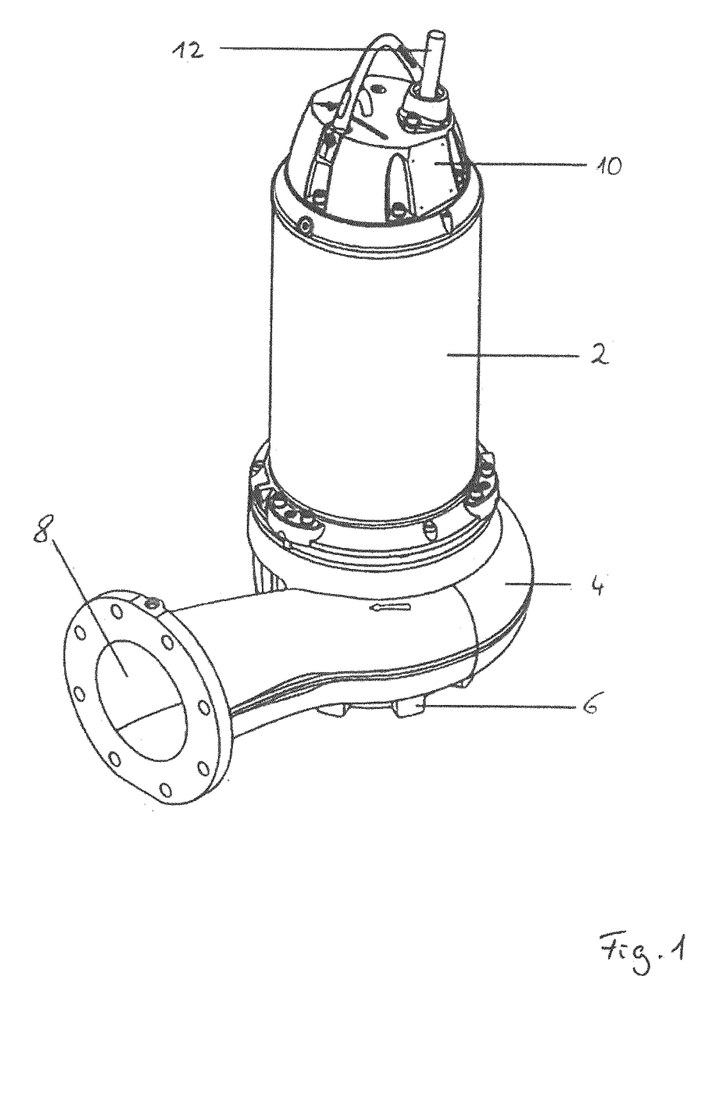
FIG. 1 is a perspective view of a pump assembly according to the invention.

Referring to the drawings, the pump shown in FIG. 1 is a submersible pump which may be used as a waste water pump. The pump comprises of a motor housing 2 connected to a pump housing 4. The motor housing 2 houses an electric drive motor for driving at least one impeller (not shown) arranged in the pump housing 4. The pump housing 4 comprises an inlet 6 on the bottom and an outlet 8 extending in radial direction from the outer circumference of the pump housing 4. On the axial end opposite to the pump housing 4 there is arranged an electronics housing 10. The electronics housing 10 contains the control electronics 14 for controlling the pump (see FIG. 2). In this example the control electronics 14 are electronics for collecting different sensor signals and for communication with external control devices placed outside a well or pump pitch. The power electronics for controlling the drive motor may be placed outside the pump and outside the well. However, it is also possible to arrange all necessary power and control electronics inside the electronics housing. Connected to the electronics housing 10 is an electric cable 12 for power supply.

Figure 2:
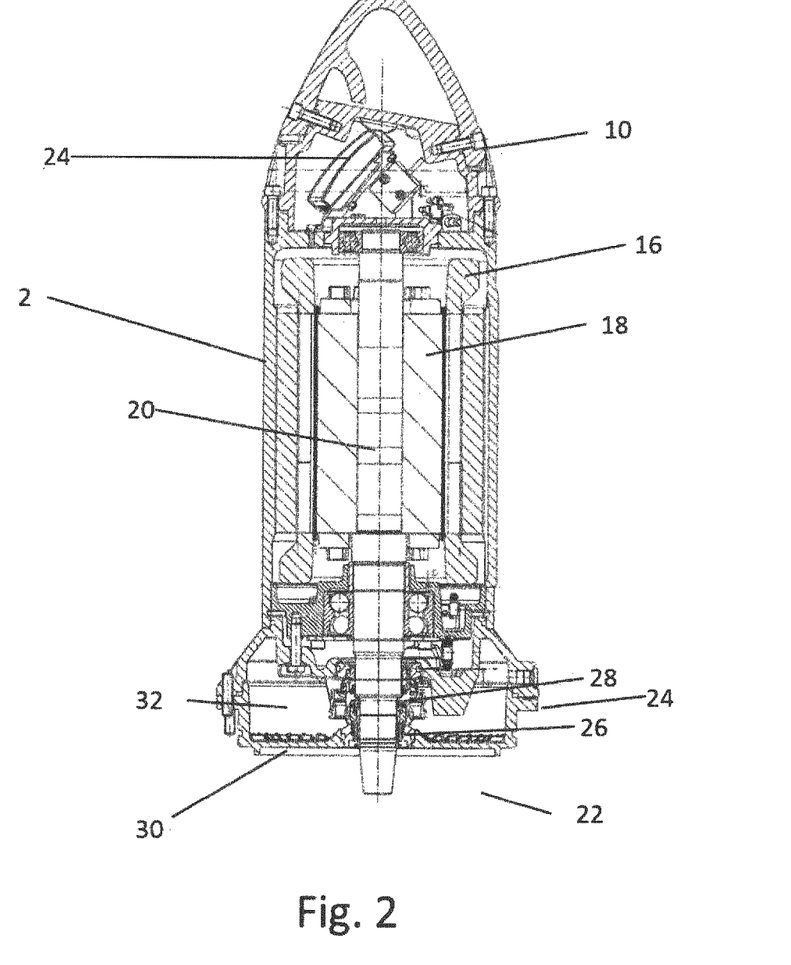
FIG. 2 is a cross sectional view of the pump according to FIG. 1.

FIG. 2 shows a cross sectional view of the motor housing 2 with the electronics housing 10. Inside the motor housing 2 there is arranged a dry-running electric drive motor comprising a stator 16 and a rotor 18. The rotor 18 is attached to a drive shaft or shaft 20 for driving an impeller arranged in the pump housing 4. In the view shown in FIG. 2 the pump housing 4 is omitted. The impeller would be connected to the free axial end 22 of the shaft 20. The free end 22 extends out of the axial end of the motor housing 2 opposite to the electronics housing 10. For sealing the interior of the motor housing 2 to the outside a sealing assembly 24 is connected to the axial end of the motor housing through which the shaft 20 extends into the pump housing.

This sealing assembly 24 comprises two shaft seals 26 and 28. The two shaft seals 26 and 28 are distanced from one another in direction of the longitudinal axis X of the shaft 22. The shaft seal 26 is a primary shaft seal arranged close to the pump housing in a separating wall 30 separating the interior of the pump housing from the interior of the sealing assembly 24. This means that the primary shaft seal 26 is a shaft seal sealing the interior of the sealing assembly 24 towards the pump housing 4. The distanced secondary shaft seal 28 is arranged towards the interior of the motor housing 2 sealing the interior of the sealing assembly 24 towards the interior of the motor housing 2. In the interior of the sealing assembly 24 there is formed a liquid space in form of a liquid reservoir 32 containing a liquid as a lubricant and coolant. This liquid preferably is glycol or a glycol-water-mixture. Thus, the liquid reservoir 32 is arranged between the two shaft seals 26 and 28 and surrounding the drive shaft 20 as a cooling jacket. The lubricant and cooling inside the liquid reservoir ensures lubrication and cooling of the shaft seals 26 and 28. Furthermore, the liquid inside the liquid reservoir is separating the pump housing from the interior of the drive motor 2 preventing liquid from the pump housing, i.e. for example the water to be delivered from directly entering into the motor housing 2. In case of wear or fault of the primary shaft seal 26 liquid, i.e. for example water may enter from the inside of the pump housing 2 into the liquid reservoir 32. This may be detected by a sensor 34 as described in the following.

Figure 3:
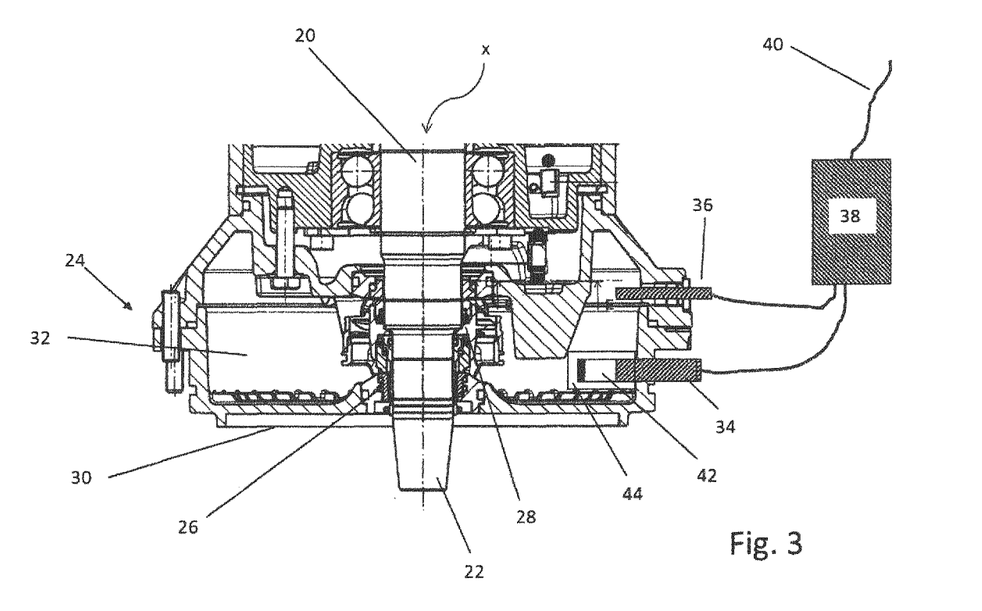
FIG. 3 is an enlarged cross sectional view of the seal assembly of the pump as shown in FIG. 2.

As can be seen in the enlarged view according to FIG. 3 there are arranged two sensors inside the liquid space or liquid reservoir 32. The first sensor 34 is a concentration sensor for example in form of a capacitive sensor. The second sensor 36 is a temperature sensor. The sensor 34 and the temperature sensor 36 are connected to a control device in form of an evaluation unit 38 for evaluating the sensor signals. The evaluation unit 38 may be connected via a signal cable 40 to an external control or an external alarm device or to the control electronics 14 inside the electronics housing 10. In an alternative embodiment the evaluation unit 38 may be arranged inside the electronics housing 10 or according to a further preferred embodiment integrated into the control electronics 14. The concentration sensor 34 is configured to detect the concentration of a certain compound or component inside the liquid contained in the liquid reservoir 32. Thus, in this example the concentration is the material property of the liquid contained in the liquid reservoir 32. For example the concentration sensor 34 is configured to detect the concentration of glycol inside the liquid contained in the liquid reservoir 32, wherein the liquid preferably is glycol or a glycol-water-mixture. For this the sensor may be a capacitive sensor whereas a capacitance detected by the sensor 34 corresponds to a certain concentration of the compound or component as glycol. The relation between capacitance and concentration may be detected experimentally in advance and stored in a memory inside the evaluation unit 38. Since this relation may be temperature depending also the temperature influence may be detected experimentally in advance and also be part of the data stored in the evaluation unit 38. Based on the temperature detected by temperature sensor 36 and a signal from concentration sensor 34, as for example a detected capacitance, the evaluation unit 38 may evaluate the corresponding concentration of a certain compound like glycol on basis of the data stored in the memory of the evaluation unit 38.

In case of wear or a fault of the primary shaft seal 36 the liquid to be delivered like water may enter from the pump housing 4 into the liquid reservoir 32. This results in a change of concentration of the regarded compound inside the liquid contained in the liquid reservoir 32. For example the concentration of glycol in a glycol-water-mixture will decrease. In case that the detected or evaluated concentration exceeds a predefined threshold, in particular falls below a certain minimum, the evaluation unit 38 may set a control parameter or control signal like for example an alarm signal and output this signal via the signal cable 40. This signal may cause the control electronics 14 to stop the pump and/or output an alarm to the user showing that there is a defect of the seal assembly 24.

Figure 6:
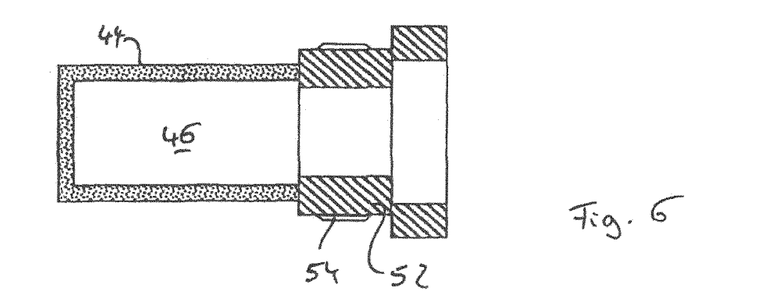
FIG. 6 is a cross sectional view of a filter element for the sensor according to FIG. 5.

A problem with the detection of concentration may arise from gas bubbles contained in the liquid inside the liquid reservoir 32. Such gas bubbles may accumulate on the sensing section 42 and have an impact on the measurement of sensor 34. This may be a problem not only for concentration sensors like capacitive sensors but any kind of sensors, like for example pressure sensors. To reduce the influence of gas bubbles and to reduce the ingress of gas bubbles towards the sensor there is arranged a filter element 44 around the sensor 34, as best shown in the enlarged view of FIG. 4. In this example the filter element 44 has a shape of a cylindrical sleeve with circular cross section, wherein one axial end of the sleeve is also closed by the filter material. Thus, the filter element 44 has a cup-like shape. The filter element 44 encloses a portion 46 of the liquid reservoir 32 forming a sensor space. In this portion 46 of the liquid reservoir the sensing section 42 of the sensor 44 is arranged. The sensor 34 has an oblong shape and extends through the open end of the sleeve (filter element 44) into the interior of the filter element 44, i.e. the sensor space 46 of the liquid reservoir 32. With the open end the filter element 44 abuts against the inner wall surrounding the liquid reservoir 32. Thus, the filter element 44 substantially surrounds the entire part of the sensor 34 extending into the liquid reservoir 32, i.e. in particular the sensing section 42 of the sensor 34. By this arrangement the filter element 44 shields the sensor 34 and in particular the sensing section 42 with respect to the surrounding liquid space or liquid reservoir 32, respectively. Thus, a fluid exchange between the sensor space formed by the portion 46 of the liquid reservoir and the surrounding portion of the liquid reservoir is possible only by passing the filter element 44. In this case the filter element has an additional venting device in form of a venting opening 48 arranged on the upper end (shown in detail in FIG. 8). In this embodiment beside the venting hole 48 there are no further openings in the filter element 44 towards the surrounding portion of the liquid reservoir 32. The filter element 44 is distanced from the outer walls of the sensor 34 and the sensor section 42 such that the sensor section 42 is surrounded by liquid inside the filter element 44. A further embodiment of the filter element without venting opening is shown in FIGS. 6 and 7.

Figure 4:
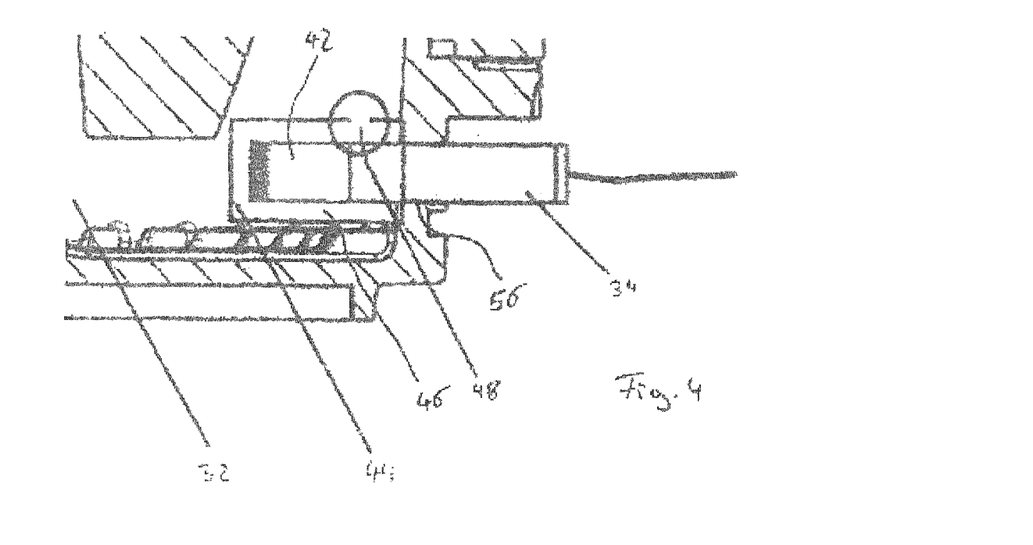
FIG. 4 is an enlarged cross sectional view of the sensor arrangement shown in FIG. 3.
Figure 5:
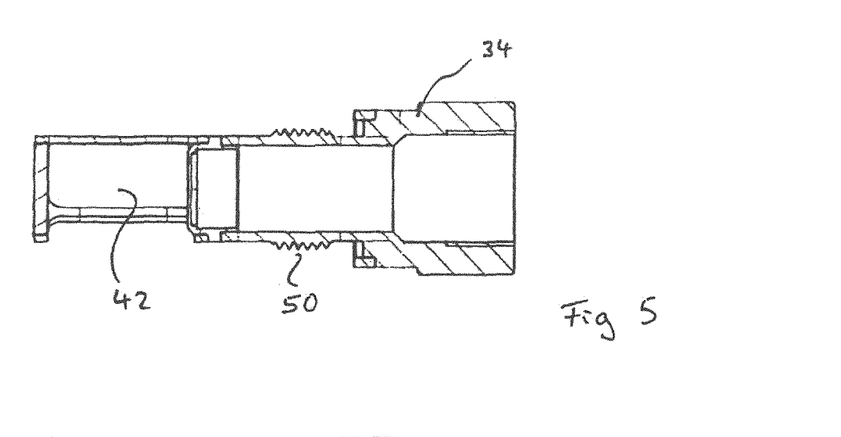
FIG. 5 is a cross sectional view of the sensor.

The filter element 44 can be made from an open porous material for example made from a polymer or a metal, or can comprise a mesh- or net-structure. Preferably the filter material is configured such that it substantially has no direct or straight extending through holes. The filter structure allows the liquid to pass through the wall of the filter element 44 ensuring a liquid exchange between the sensor space 46 in the interior of the filter element 44 and the surrounding liquid reservoir 32. By this it can be ensured that the liquid inside the filter element 44 has the same material properties as the liquid surrounding the filter element 44 on the outside. In particular the concentration of the compound to be detected, preferably the concentration of glycol inside and outside the filter element 44 is substantially the same.

The filter element shields the sensor section 42 such that the amount of gas bubbles reaching the sensor 34 or the sensor section 42 can be decreased, in particular by decreasing the ingress of gas bubbles into the interior of the filter element 44. This can be achieved by two effects of the open porous material of the filter element 44. First of all the size of the pores of the filter element 44 may be configured such that gas bubbles exceeding a certain diameter are hindered from passing through the wall of the filter element 44, whereas the liquid preferably can freely pass the filter element 44. This means preferably the filter element is permeable for the liquid, but has a reduced permeability for gas bubbles above a certain size. Thus, gas bubbles will collect on the outside of the sleeve-like filter element 44 and drive upwards by buoyancy. A second effect which may be achieved by the filter is that a fluid flow passing through the porous material of the filter is slowed down and becomes more laminar with a uniform velocity profile. This leads to less bubble dynamics. As a result the bubbles become more stable and collision and coalescence takes places easier. The effect of buoyancy force will be elevated which causes bubbles to rise. By this the bubbles will rise toward the upper inner surface of the sleeve forming the filter element 44. Thus, gas bubbles will collect below the upper surface of the filter element 44 and leave the filter element through the venting hole 48. By this the gas bubbles are prevented from accumulating on the surface of the sensor 34, in particular the sensing section 42. As mentioned before the gas bubbles may collect on the outside of the filter and grow on the outside of the filter until they rise due to buoyancy.

Figure 7:
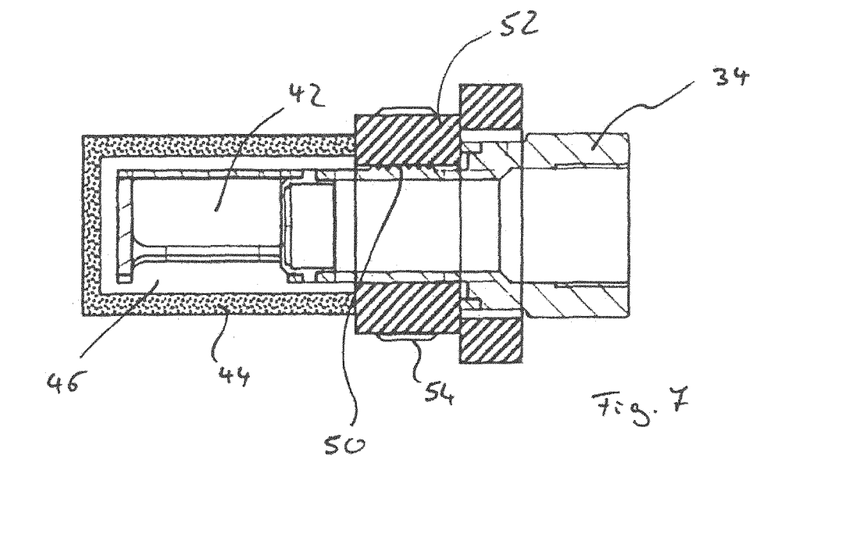
FIG. 7 is a cross sectional view of the sensor according to FIG. 5 with the filter element according to FIG. 6 attached to the sensor.
Figure 8:
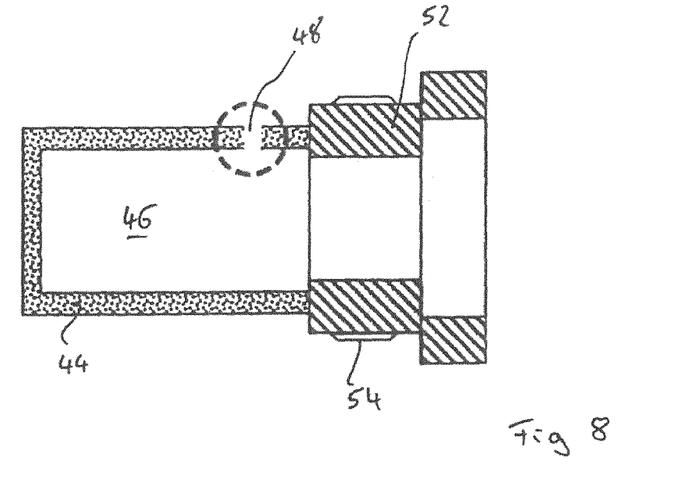
FIG. 8 is a cross sectional view of a second alternative embodiment for the filter element as shown in FIG. 6.

FIGS. 5 to 8 are showing a possible configuration of the sleeve-like filter element 44 and the sensor 34. The sensor 34 may have a thread 50 on the outside of a support structure. The porous filter 44 with its open end is connected to a tubular support sleeve 52. As can be seen in FIG. 7 the sensor 34 is inserted into the cup-shaped filter element 44 through the support sleeve 52 at its open end. Thereby the thread 50 engages with the inner circumference of the support sleeve 52 which may be provided with a corresponding thread (not shown). In an alterative solution there may be a press-fit or any other suitable connection between the inner wall of the support sleeve 52 and the outer wall of the sensor 34 in the region of the thread 50. The support sleeve 52 on its outer circumference is provided with a further thread 54 by which the support sleeve 52 may be screwed into a through hole opening 56 in the wall delimiting the liquid reservoir 32.

While specific embodiments of the invention have been shown and described in detail to illustrate the application of the principles of the invention, it will be understood that the invention may be embodied otherwise without departing from such principles.

LIST OF REFERENCE CHARACTERS 2 motor housing
4 pump housing
6 inlet
8 outlet
10 electronics housing
12 electronic cable
14 control electronics
16 stator
18 rotor
20 shaft
22 free end
24 sealing assembly
26, 28 shaft seals
30 separating wall
32 liquid reservoir 34 sensor, concentration sensor
36 temperature sensor
38 evaluation unit, control device
40 signal cable
42 sensing section
44 filter element
46 portion of the liquid reservoir, sensor space
48 venting hole, venting opening
50 thread
52 support sleeve
54 thread
56 opening
X longitudinal/rotational axis of the shaft

The invention claimed is:

1. A pump assembly comprising:
structure defining an interior with at least one liquid space in the interior, said liquid space being configured to contain a liquid or receive a liquid, wherein the liquid space is a closed cavity;
a sensor arranged in the liquid space and configured to detect at least one material property of liquid located in the liquid space; and
a filter element arranged in the interior of the liquid space to shield the sensor with respect to the surrounding liquid space, the filter element being permeable to the liquid, wherein the filter element is configured to decrease an ingress of gas bubbles towards the sensor, the liquid space being part of a sealing assembly, wherein the filter element delimits a sensor space inside of the liquid space, in the inside of which sensor space at least one sensing section of the sensor is arranged, wherein a venting device is arranged in the filter element, the venting device being configured to vent the sensor space delimited by the filter element.

2. A pump assembly according to claim 1, wherein said sensor is arranged inside said liquid space such that the sensor is submerged into the liquid contained in the liquid space.

3. A pump assembly according to claim 1, wherein the filter element is configured such that there is no pressure difference across the filter element.

4. A pump assembly according to claim 1, wherein the sensor is a concentration sensor which is configured to detect a concentration of a component in the liquid which is located in the liquid space.

5. A pump assembly according to claim 1, wherein the sensor comprises an ultrasound sensor and/or a capacitance sensor and/or an optical sensor.

6. A pump assembly according to claim 1, wherein the liquid space is part of a sealing assembly arranged between an electric drive motor and a pump housing, wherein the sealing assembly comprises two shaft seals and said liquid chamber forms a liquid reservoir arranged between these two shaft seals.

7. A pump assembly according to claim 1, wherein the liquid space is a liquid reservoir.

8. A pump assembly according to claim 1, wherein the filter element comprises an open porous material.

9. A pump assembly according to claim 1, wherein the filter element is at least partly made from a polymer and/or metal material.

10. A pump assembly according to claim 1, wherein the filter element in a vertical upper region comprises at least a region having a larger pore size or at least one hole.

11. A pump assembly according to claim 1, wherein the filter element forms a sleeve around the sensor.

12. A pump assembly according to claim 1, wherein the filter element comprises an opening at one end, through which opening the sensor extends into the interior of the filter element.

13. A pump assembly according to claim 1, wherein the pump assembly is configured as a submersible pump assembly and/or configured as a waste water pump assembly.

14. A pump assembly according to claim 1, further comprising a control device connected to said sensor, said control device being configured to set a control parameter if the at least one characteristic detected by said sensor reaches a predefined threshold.

15. A method of controlling a pump assembly, wherein the pump assembly comprises at least one liquid space in an interior, which liquid space contains a liquid or is configured for receiving a liquid, the method comprising:
arranging a sensor in the liquid space of the pump assembly, wherein the liquid space is a closed cavity;
arranging a filter in the interior of the liquid space thereby shielding the sensor with respect to the surrounding liquid space;
detecting with the sensor and during operation of the pump assembly at least one material property of the liquid in the liquid space preferably a concentration of component in the liquid;
comparing the material property of the liquid to a predefined threshold; and
setting a control parameter of the pump assembly in dependence on said comparison.

16. A pump assembly comprising:
a pump housing having a pump housing interior with at least one closed cavity in the pump housing interior, said at least one closed cavity being configured to contain a first liquid or receive a first liquid;
a sensor arranged in said at least one closed cavity, said sensor being configured to detect a second liquid entering the at least one closed cavity based on a concentration of the first liquid in said at least one closed cavity, the first liquid being different from the second liquid; and
a filter element arranged in the interior of said closed cavity, the filter element being configured to shield the sensor with respect to the surrounding at least one closed cavity, the filter element being permeable to the liquid, the liquid space being part of a sealing assembly, the liquid space being part of a sealing assembly arranged between an electric drive motor and a pump housing, wherein the sealing assembly comprises two shaft seals and said liquid chamber forms a liquid reservoir arranged between these two shaft seals, wherein a venting device is arranged in the filter element, the filter element at least partly separating a space containing the sensor from a further surrounding inside the liquid space.

17. A pump assembly, comprising:
a sensor arranged in a liquid space, wherein the liquid space is a closed cavity, the liquid space containing a liquid or the liquid space being configured to receive a liquid, the sensor being configured to detect at least one material property of the liquid in the liquid space during operation of the pump assembly;
a filter arranged in an interior of the liquid space thereby shielding the sensor with respect to the surrounding liquid space;
a controller configured to receive the at least one material property of the liquid and compare the material property of the liquid to a predefined threshold, the controller being further configured to set a control parameter of the pump assembly based on a comparison of the material property of the liquid to the predefined threshold.

* * * * *